US008817188B2

(12) United States Patent
Yang et al.

(10) Patent No.: US 8,817,188 B2
(45) Date of Patent: Aug. 26, 2014

(54) SYSTEMS AND METHODS FOR AUTOMATIC ADJUSTMENT OF TEXT

(75) Inventors: Chen-Yan Yang, Sindian (TW); Yu Chung Lee, Yonghe (TW)

(73) Assignee: Cyberlink Corp, Shindian, Taipei (TW)

(*) Notice: Subject to any disclaimer, the term of this patent is extended or adjusted under 35 U.S.C. 154(b) by 1677 days.

(21) Appl. No.: 11/782,279

(22) Filed: Jul. 24, 2007

(65) Prior Publication Data

US 2009/0027552 A1  Jan. 29, 2009

(51) Int. Cl.
| | |
|---|---|
| H04N 5/445 | (2011.01) |
| H04N 21/431 | (2011.01) |
| G11B 27/34 | (2006.01) |
| H04N 21/435 | (2011.01) |
| H04N 7/088 | (2006.01) |
| H04N 21/485 | (2011.01) |
| G11B 27/034 | (2006.01) |
| H04N 21/44 | (2011.01) |
| H04N 21/488 | (2011.01) |
| H04N 7/01 | (2006.01) |
| G11B 27/30 | (2006.01) |

(52) U.S. Cl.
CPC ....... *H04N 5/44513* (2013.01); *H04N 21/4312* (2013.01); *G11B 27/34* (2013.01); *G11B 2220/2562* (2013.01); *H04N 21/4355* (2013.01); *H04N 7/0882* (2013.01); *H04N 21/4858* (2013.01); *G11B 2220/2541* (2013.01); *G11B 27/034* (2013.01); *H04N 21/44008* (2013.01); *H04N 21/4884* (2013.01); *H04N 21/4314* (2013.01); *H04N 7/0122* (2013.01); *G11B 27/3027* (2013.01)

USPC ........... 348/564; 725/136; 725/137; 348/468; 348/556; 348/563; 348/565; 348/581; 386/245; 386/246

(58) Field of Classification Search
USPC ......................... 348/468, 556, 563–565, 581; 386/245–246; 725/136–137
See application file for complete search history.

(56) References Cited

U.S. PATENT DOCUMENTS

| | | | | |
|---|---|---|---|---|
| 5,546,131 A | * | 8/1996 | Terry | 348/564 |
| 5,760,840 A | | 6/1998 | Tani et al. | |
| 5,805,153 A | * | 9/1998 | Nielsen | 725/37 |
| 6,340,992 B1 | | 1/2002 | Markandey | |
| 6,757,023 B2 | | 6/2004 | Chien et al. | |
| 2003/0189669 A1 | * | 10/2003 | Bowser | 348/564 |
| 2004/0252238 A1 | * | 12/2004 | Park et al. | 348/556 |

* cited by examiner

*Primary Examiner* — Yassin Alata
(74) *Attorney, Agent, or Firm* — McClure, Qualey & Rodack, LLP (57) ABSTRACT

Systems and methods for automatic adjustment of text in a video are described. At least one embodiment includes a system for automatic adjustment of text in a video on a display comprising a ratio detector configured to detect an original aspect ratio of the video, an edge locator configured to identify edges of the video based on the original aspect ratio detected, wherein regions between the edges of the video and edges of the display define unused regions, a size assessment module configured to determine size of the text, wherein the size assessment module determines the size of the text by examining at least one of light portions within the text and a bounding rectangle which surrounds the text. The system further comprises a text adjuster configured to move the text to the unused region above or below the video, wherein the text adjuster further aligns the text to at least one of the edges of the video and the edges of the display device.

22 Claims, 9 Drawing Sheets

SYSTEMS AND METHODS FOR AUTOMATIC ADJUSTMENT OF TEXT

TECHNICAL FIELD

The present disclosure generally relates to automatic adjustment of text in videos.

BACKGROUND

Over the years, an increasing amount of audio and video content has become available to consumers through broadcast, cable, on-demand, fixed media, and other available sources of multimedia content. Consumers therefore have easy access to an increasing amount of content and programming. Furthermore, there are many devices (e.g., PCs, DVD recorders) and services readily available that allow consumers to view multimedia content.

Generally, unused regions or "black bars" result from a mismatch between the video aspect ratio and the aspect ratio of the display on which the video is being viewed. For example, a movie with an aspect ratio of 16:9 that is being viewed on a television with an aspect ratio of 4:3 will usually be accompanied by black bars displayed above and below the video. Generally, this is known as letterboxing. The term letterboxing refers to transferring or displaying widescreen video content such as films to displays with a different aspect ratio (e.g., 4:3) while preserving the original aspect ratio of the widescreen video content. The result is that a portion of the video display will contain black bars above and below the movie. If letterboxing is not implemented, the alternative is that the original widescreen video content must be cropped in order to accommodate the 4:3 ratio of television screens. Letterboxing offers the advantage of allowing the viewer to view the video as originally viewed in the theater. Finally, it should be noted that even on widescreen televisions with a 16:9 aspect ratio, letterboxing might still be necessary in some instances because some movies are filmed in even wider formats (2.35:1, 1.78:1, 1.85:1, 2.40:1, etc.). As a result, black bars still appear on the display.

For many viewers, subtitles or closed captioning plays an integral part in being able to fully experience a particular film or television program. For some viewers, closed captioning is an important means for allowing them to follow dialog that takes place during the course of a film or television program. For others, subtitles allow viewers to follow dialog in another language. Subtitles and closed captioning may be displayed in a number of ways. In some instances, the words appear from left to right, one line at a time, in a scrolling fashion. In other instances, the words for a spoken sentence may appear all at one time on the screen. This style of closed captioning is common for pre-recorded content such as television programs and movies. Regardless of the manner in which closed captioning or subtitles are displayed, one common problem is that subtitles or closed captioning are generally shown in a fixed location of the display, and in many instances, will obstruct a portion of the viewing area. Therefore, a need exists in the industry to address these deficiencies and inadequacies.

SUMMARY

Briefly described, one embodiment, among others, includes a system for automatic adjustment of text in a video on a display comprising a ratio detector configured to detect an original aspect ratio of the video, an edge locator configured to identify edges of the video based on the original aspect ratio detected, wherein regions between the edges of the video and edges of the display define unused regions, a size assessment module configured to determine size of the text, wherein the size assessment module determines the size of the text by examining at least one of light portions within the text and a bounding rectangle which surrounds the text. The system further comprises a text adjuster configured to move the text to the unused region above or below the video, wherein the text adjuster further aligns the text to at least one of the edges of the video and the edges of the display device.

Another embodiment includes a method for automatic adjustment of text in a video on a display comprising detecting an original aspect ratio of the video, identifying edges of the video based on the original aspect ratio, wherein regions between the video edges and edges of the display define unused regions. The method further comprises determining the size of the text and moving the text to the unused region above or below the video such that the text does not overlap with the video, wherein moving the text further comprises aligning the text to at least one of the edges of the video and the edges of the display.

Yet another embodiment includes a computer-readable medium having a computer program for editing a video comprising logic for identifying edges of the video and edges of the display, wherein regions between the video edges and the display define unused regions; logic for determining the size of the text; logic for moving the text to the unused region above or below the video such that the text does not overlap with the video, wherein moving the text further comprises aligning the text to at least one of the edges of the video and the edges of the display; and logic for automatically resizing the text if the size of the text overlap the video.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

As discussed above, generally, the display of "black bars" (i.e., letterboxing) results from a mismatch between the video aspect ratio and the aspect ratio of the display on which the video is being shown. For example, a movie with a widescreen aspect ratio of 16:9 shown on a television with an aspect ratio of 4:3 will result in black bars being displayed above and below the video. Again, if letterboxing is not implemented, the original widescreen video must be cropped to accommodate the 4:3 ratio of television screens. Letterboxing therefore offers the advantage of allowing viewers to enjoy the video content (such as a film) as originally viewed in the theater, for example.

For purposes of nomenclature used herein, the general reference to text within a video simply refers to dialog in textual form shown on the display. Non-limiting examples of such text include subtitles and closed captioning. As discussed in the background, one apparent shortcoming found in conventional approaches for displaying text such as subtitles and closed captioning in conjunction with the video is that such text is generally located in a fixed location with respect to the display. Therefore, depending on the aspect ratio of the video and the size of the display, the text may overlap with the video content, thereby blocking part of the video even if there is a region of unused region above and below the video. This may ultimately affect the viewing experience for the consumer. While letterboxing offers the advantage of allowing the viewer to view the video as originally viewed in the theater, subtitles that block part of the viewing area can be very distracting, particularly in action-packed scenes, for instance.

At the same time, however, subtitles and closed captioning can be very useful for following the dialog that takes place during the course of the movie or television program. Video content stored on such media as DVDs (Digital Video Disc), for example, typically offer consumers the option to view the video while listening to the audio portion in a language other than the language originally associated with the video. For example, consumers may elect to view a movie originally recorded in English while listening to the audio portion dubbed in Mandarin. Furthermore, consumers usually have the option of viewing the video content while viewing subtitles in a selected language. As an example, it's possible to view a video while listening to the audio portion dubbed in French and while displaying subtitles in Spanish. As generally known, subtitles refer to the text displayed on top of the video which convey the dialog taking place in the video. Subtitles may be a form of translation in a particular language or simply a textual rendering of the dialog in the same language in which the video/audio portions were recorded. Subtitles therefore offer viewers an alternative means to follow the dialog taking place within the video. However, it can also be very distracting when subtitles block part of the viewing area.

Embodiments of systems and methods for automatically adjusting text within a video are disclosed. Certain embodiments of systems disclosed herein address the perceived shortcomings described above by determining the edges of the video and the edges of the display. In this way, the size and location of the unused regions may be determined. The size of the text (e.g., subtitles or closed captioning) shown on the display is also determined. In some embodiments, the text is then moved entirely into the unused region above or below the video, such that the text is aligned to either one of the edges of the video or to one of the edges of the display. It should be appreciated that for the embodiments discussed herein, the text on the display is moved so that the viewer can watch the video and text without the text overlapping the video. It should further be appreciated that for some embodiments, the viewer can manually select the aspect ratio of the video whereby the location of the edges of the video may be determined. In other embodiments, the viewer may also select which edge the text is aligned via an input device such as a mouse, for example. In such embodiments, the input device is used by a user to select various options via user interfaces that will be described in more detail below. Such user interfaces may allow the user to perform such operations as: aligning text to the top edge of a display, aligning text to the top edge of a video, aligning text to the bottom edge of the display, and aligning text to the bottom edge of the video.

Figure 1:
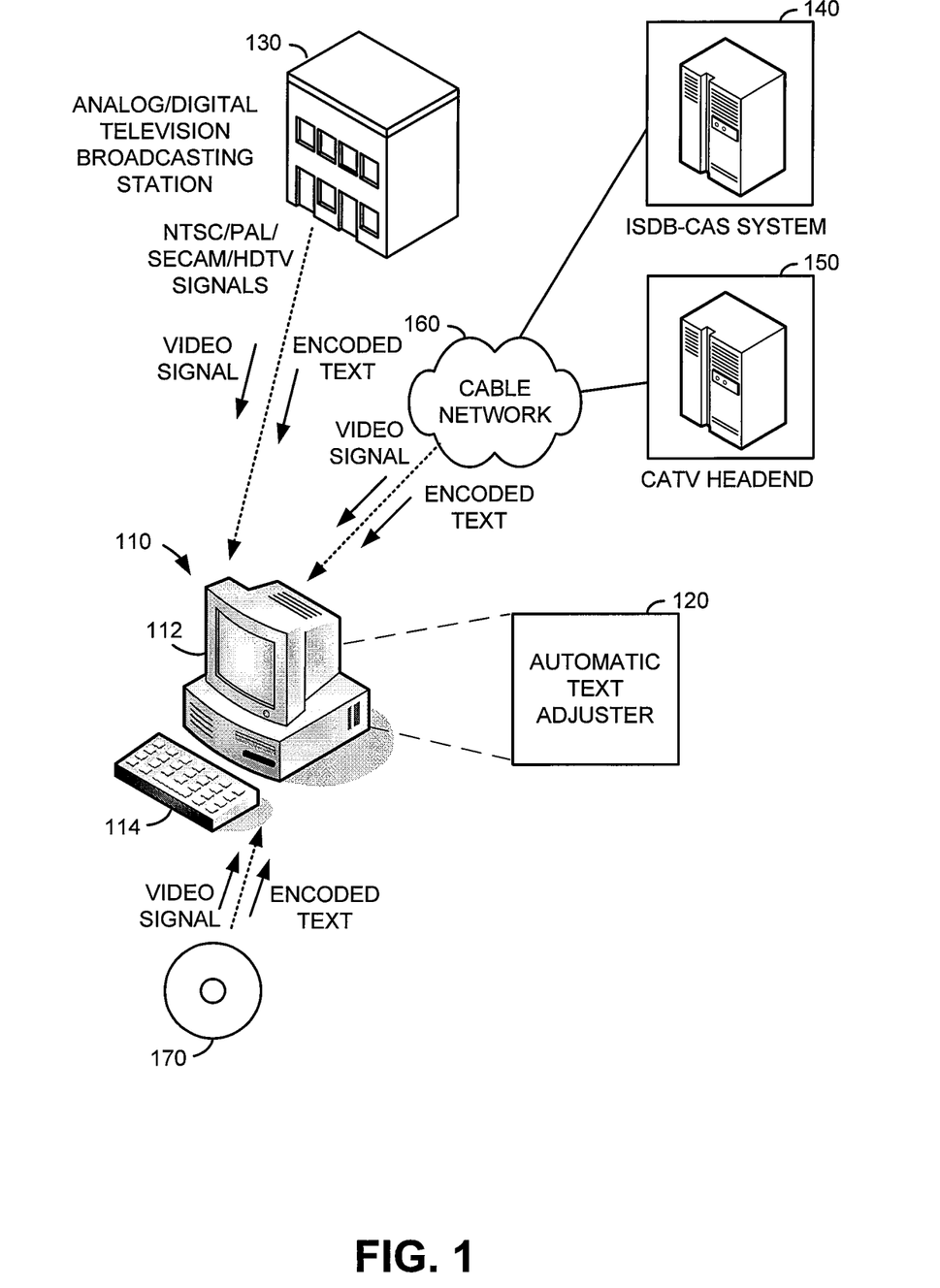
FIG. 1 depicts a top-level flow diagram for an embodiment of a system for automatic adjustment of text in a video.

Reference is now made to FIG. 1, which depicts a top-level flow diagram for an embodiment of a system for automatic adjustment of text in a video. As illustrated in the non-limiting example of FIG. 1, the system includes a video viewing device 110 having a display 112 and a user input device 114, which, for example, may be a keyboard or a mouse. The video viewing device 110 may be any type of computer system such as personal computer or a laptop or a digital home television, for example.

Video content (e.g., movies, television programs) may be received by the video viewing device 110 from a number of sources. Depending on the particular embodiment, video content may be received via a television transmission from a television broadcasting station 130. Signals sent from the television station 130 may be encoded according to such traditional formats as those used in NTSC (National Television Standards Committee) systems, PAL (Phase Alternating Line) systems, and SECAM (Sequential Color with Memory) systems. Similarly, television signals may also be transmitted from a digital broadcasting system in the form of HDTV (high-definition television) signals.

In alternative embodiments, video content may be received by the video viewing device 110 from an operator of an ISDB-CAS (Integrated Services Digital Broadcasting Conditional Access System) system 140 such as B-CAS (BS Conditional Access Systems Co., Ltd.). In these systems, digital media content is sent over a cable network 160 to subscribers in encrypted form such that subscribers have conditional access to the media content. In other embodiments, video content may be received over a cable network 160 from a CATV (cable television) headend 150. In yet other embodiments, video may be read from storage media 170 such as DVDs, Blu-ray Discs or HD (High Definition) DVDs. In some configurations, the video viewing device 110 may include an integrated DVD-ROM or Blu-ray Disc-compatible drive for reading multimedia content from the storage medium 170. As shown in FIG. 1, regardless of the source of the video content, the assumption is made that the text (e.g., closed captioning) signal is encoded separately from the video signal and is accessible for processing. Therefore, it will be easier to identify the bounding rectangle of the text as the text is encoded separately from the video.

In operation, once the video content is received by the video viewing device 110, the user can execute one or more applications such as an automatic text adjuster 120 to adjust the subtitles or closed captioning associated with the video. For some embodiments, the automatic text adjuster 120 may be integrated into a software DVD player and configured to provide a user interface. In some embodiments, the user may be given the option of either manually or automatically adjusting placement of the text with respect to the video via an input device such as a mouse, for example.

Figure 4:
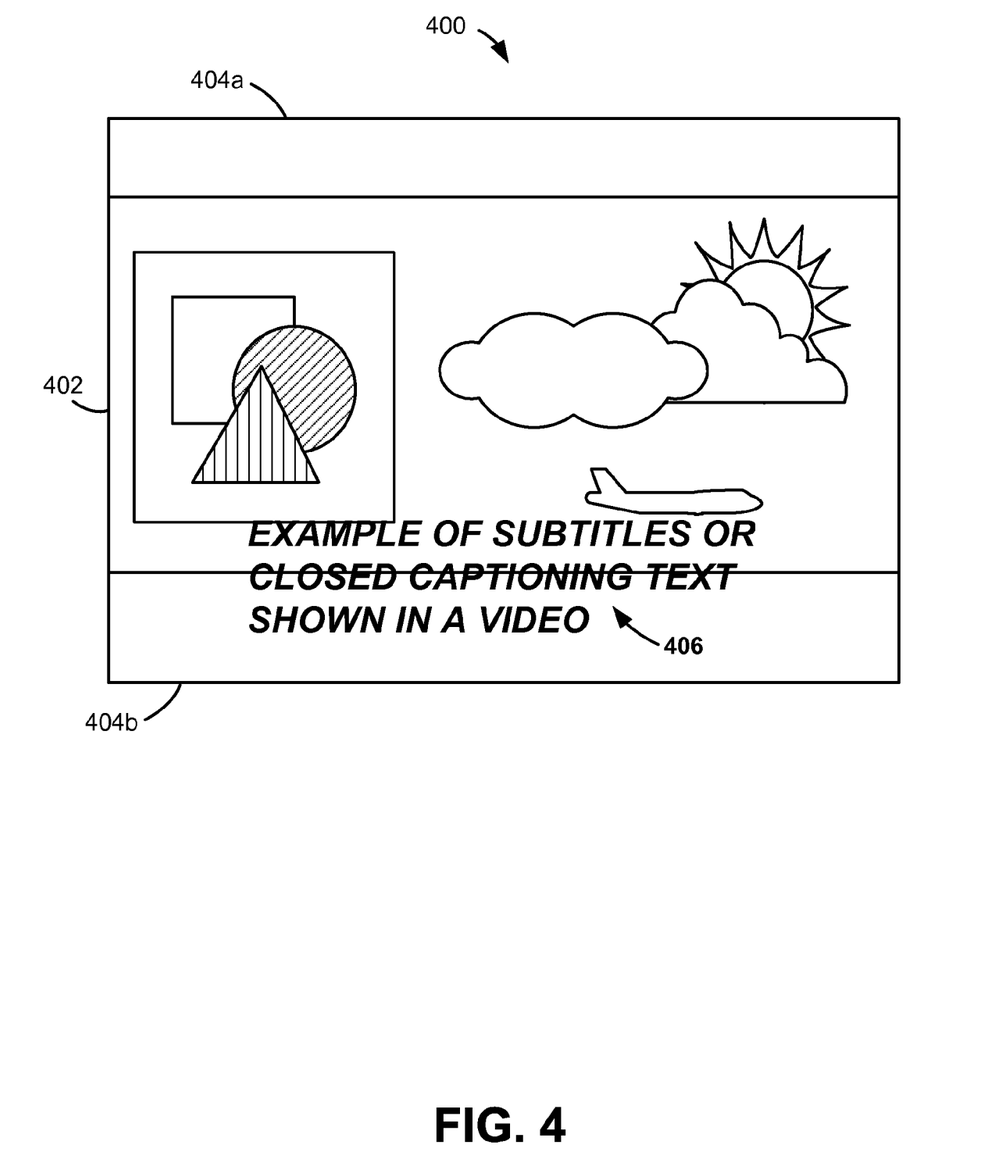
FIG. 4 illustrates an example of a conventional approach to displaying text on top of video.

As discussed above, current video viewing devices simply display subtitles or closed captioning in a fixed location in the display. Therefore, depending on the amount of dialog communicated in a particular scene, the text may span multiple lines, thereby blocking part of the viewing area. Reference is briefly made to FIG. 4, which illustrates an example of a prior art approach for displaying text on top of video. In the example shown, the display area 400 comprises both a viewing area 402 where the video is being displayed and black bars 404a, 404b. As discussed above, letterboxing occurs when displaying widescreen video (such as a movie with an 16:9 aspect ratio) to video displays (having a different aspect ratio such as a 4:3 aspect ratio) while preserving the original aspect ratio of the widescreen video. As seen in the example in FIG. 4, the text 406 overlaps with the viewing area 402. At least one exemplary embodiment of the present disclosure may be configured to automatically move the text 406 to another region of the display, in particular, to one of the black bar regions 404a, 404b above or below the viewing area 402.

Figure 2:
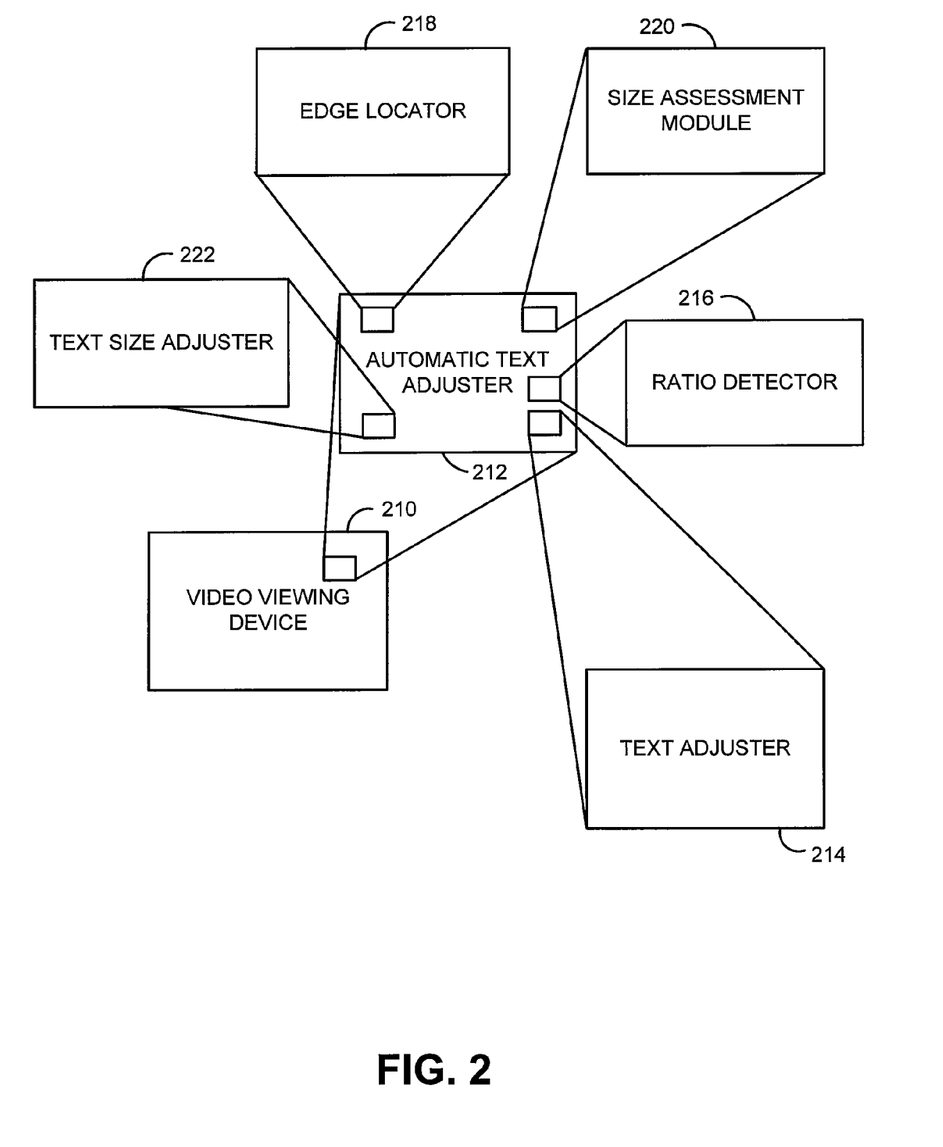
FIG. 2 depicts a functional block diagram for an embodiment of a system for automatic adjustment of text in a video from FIG. 1.

FIG. 2 depicts a functional block diagram for an embodiment of a system for automatic adjustment of text in a video. It should be noted that some components not essential for understanding (by persons skilled in the art) of the video viewing device 210 are omitted for purposes of brevity. In one embodiment, the video viewing device 210 includes an automatic text adjuster 212, which comprises a ratio detector 216, an edge locator 218, a size assessment module 220, and a text adjuster 214.

In operation, the automatic text adjuster 212 automatically moves text being shown on a video to a region outside the viewing area so that the user can view the video (in the viewing area) without any obstruction by the text such as subtitles or closed captioning. The ratio detector 216 determines the aspect ratio of the video. The edge locator 218 identifies the edges of the video and edges of the display. The regions between the video edges and the edges of the display define unused regions (i.e., black bars).

The size assessment module 220 is configured to determine the size of the text or the size of a bounding rectangle surrounding the text. This may be performed in a number of ways. For some embodiments, the size assessment module 220 determines the size of the text by examining "light" portions within the text or by examining the size of the bounding rectangle that surrounds the text. Typically, subtitles and closed captioning are displayed in a block letter font and displayed uniformly in a light color such as white or yellow so that the text stands out in contrast to the video. In other embodiments, the size of the text may be determined by detecting the pixels associated with the text. Referring back to the example in FIG. 4, the size assessment module 220 analyzes the text and determines that the subtitles being displayed for the particular scene shown spans a certain height and width.

Figure 5:
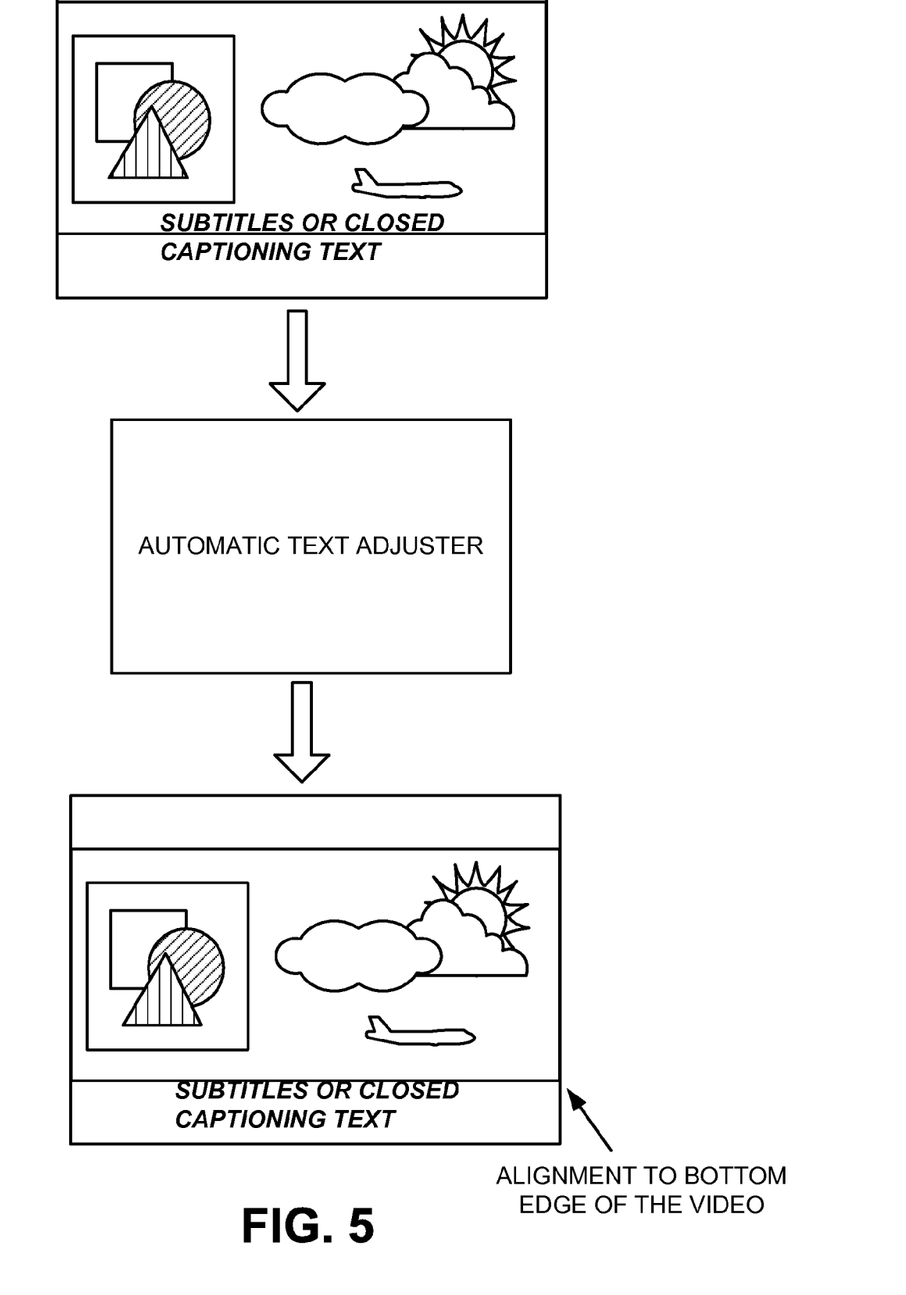
FIG. 5 illustrates an example of automatically adjusting text in a video and aligning the text to an edge within the display.
Figure 6:
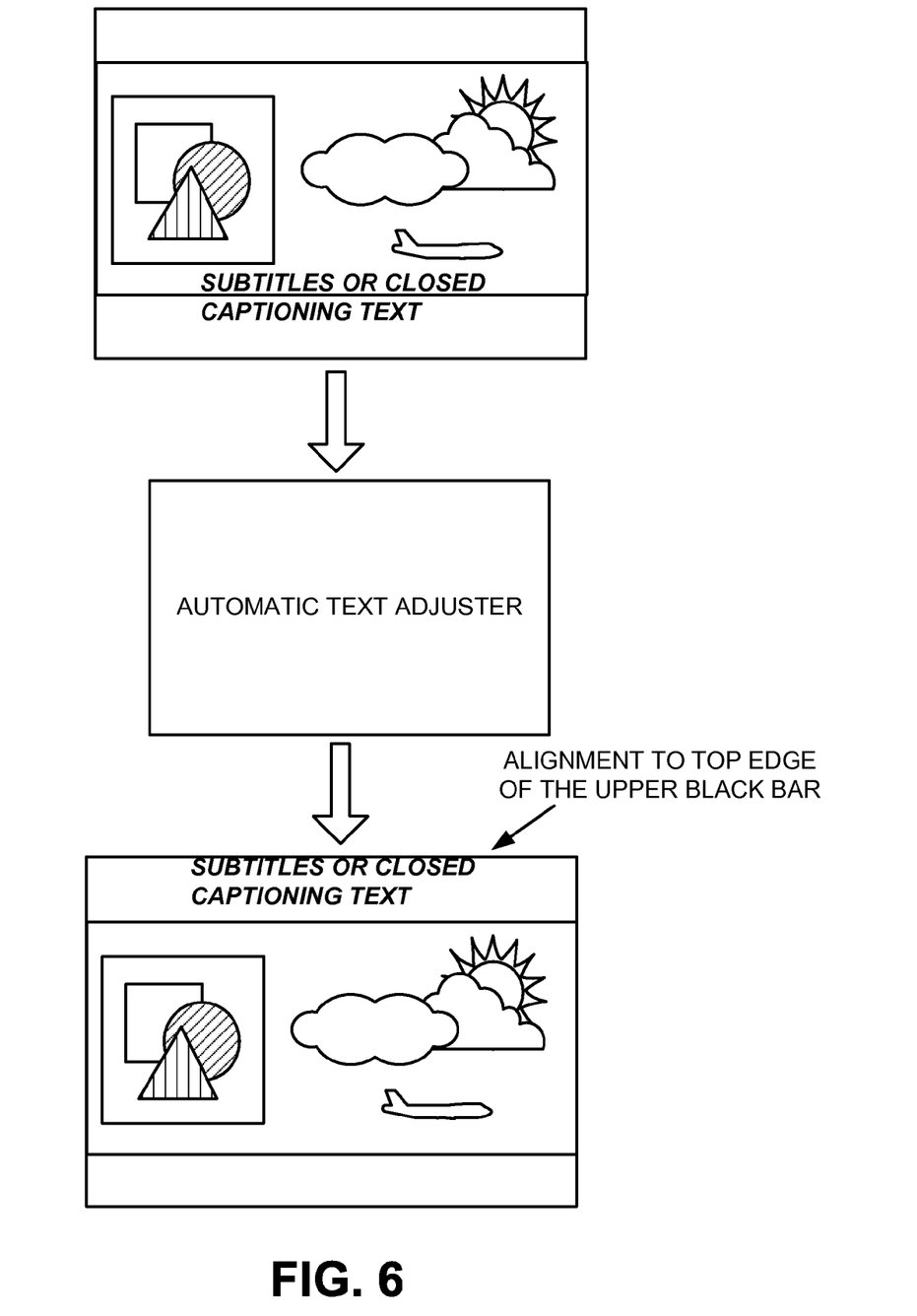
FIG. 6 illustrates another example of automatically adjusting text in a video and aligning the text to an edge within the display.

Upon determination of the text size, the text adjuster 214 moves the text to the unused region above or below the video (i.e., the viewing area). For some embodiments, the subtitle adjuster 214 moves and aligns the text to one of the edges of the video as illustrated in FIG. 5. In the example shown, the text is moved and aligned to the bottom edge of the video so that the text no longer obstructs the viewing area. In other embodiments, the subtitle adjuster 214 may move the text to one of the edges of the display. FIG. 6 illustrates the text being moved and aligned to the upper edge of the display.

In yet other embodiments, the automatic text adjuster 212 may further include a text size adjuster 222. In some instances, the size of the black bars may be too small to accommodate the subtitles or closed captioning even after alignment of the text to one of the edges (of either the video or the display). In these instances, the text size adjuster 222 automatically resizes the text in order to prevent (or minimize) overlapping of the text with the video.

Figure 3:
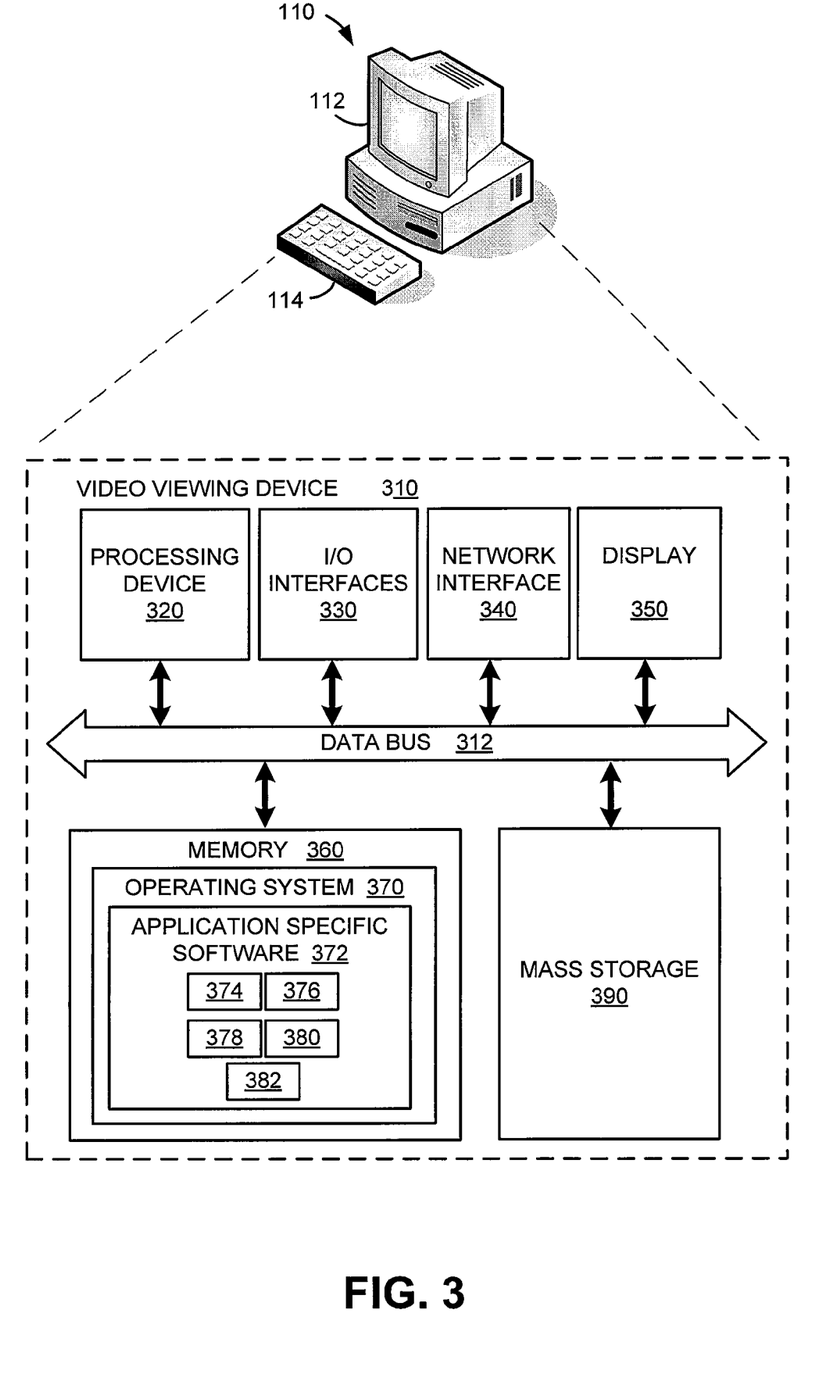
FIG. 3 is an exemplary embodiment of the video viewing device shown in FIG. 1.

Reference is now made to FIG. 3, which is an exemplary embodiment of the video viewing device from FIG. 1. For some embodiments, the video viewing device 310 may be incorporated as some type of computing device. Generally speaking, the video viewing device 310 may be any one of a wide variety of wired and/or wireless computing devices, such as a desktop computer, portable computer, dedicated server computer, multiprocessor computing device and so forth. Irrespective of its specific arrangement, the video viewing device 310 may comprise, among other components, a processing device 320, input/output interfaces 330, a network interface 340, and a display 350 connected across a data bus 312. One of ordinary skill in the art will appreciate that the video viewing device 310 can, and typically will, comprise other components, which have been omitted for purposes of brevity.

The display 350 can comprise a computer monitor or a plasma screen for a PC or a liquid crystal display (LCD), for example. The processing device 320 can include a custom-made or commercially available processor, a central processing unit (CPU) or an auxiliary processor among several processors associated with the video viewing device 310, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 360 shown in FIG. 3 can include any one of a combination of volatile memory elements (e.g., random-access memory RAM, such as DRAM, and SRAM, etc.) and nonvolatile memory elements (e.g., ROM, hard drive, tape, CDROM, etc.). The memory 360 may store a native operating system 370, one or more native applications, emulation systems, or emulated applications for any of a variety of operating systems and/or emulated hardware platforms, emulated operating systems, etc. For example, the applications may include an application specific program 372. Again, one of ordinary skill in the art will appreciate that the memory 360 can, and typically will, comprise other components, which have been omitted for purposes of brevity. The video viewing device 310 may further comprise mass storage 390. The mass storage 390 may be, for example, a disk drive, flash memory, or any other of a wide variety of storage devices capable of storing data.

The application specific software 372 shown in FIG. 2 may be a DVD software player application used for playing various disc formats such as DVD, HD DVD, and Blu-ray discs.

According to the embodiment shown in FIG. 2, the application specific software 372 may include an automatic text adjuster 374, which may further comprise an edge locator 376, a size assessment module 378, a ratio detector 382, and a text adjuster 380. In other embodiments, the automatic text adjuster 374 may further comprise a text size adjuster 222. When the application 372 is implemented in software, it should be noted that the application can be stored on a variety of computer-readable medium for use by, or in connection with, a variety of computer-related systems or methods. In the context of this document, a computer-readable medium may comprise electronic, magnetic, optical, or other physical device or apparatus that can contain or store a computer program for use by or in connection with a computer-related system or method. The interface can be embedded in a variety of computer-readable medium for use by, or in connection with, an instruction execution system, apparatus, or device, such as a computer-based system, processor-containing system, or other system that can fetch the instructions from the instruction execution system, apparatus, or device and execute the instructions.

In the context of this disclosure, a "computer-readable medium" stores, communicates, propagates, or transports the program for use by or in connection with the instruction execution system, apparatus, or device. The computer readable medium can be, for example, but not limited to, an electronic, magnetic, optical, electromagnetic, infrared, or semiconductor system, apparatus, device, or propagation medium. More specific examples (a non-exhaustive list) of the computer-readable medium may include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

Input/output interfaces 330 comprise any number of interfaces for the input and output of data. For example, where the video viewing device 310 comprises a personal computer, the components within the system may interface with a user input device such as a keyboard, a mouse, or a remote controller. The video viewing device 310 may also include a network interface 340 for transmitting and/or receiving data over a network such as video content. As a non-limiting example, the network interface 340 may include a modulator/demodulator (e.g., a modem), wireless (e.g., radio frequency (RF)) transceiver, a telephonic interface, a bridge, a router, network card, etc.

Figure 7A:
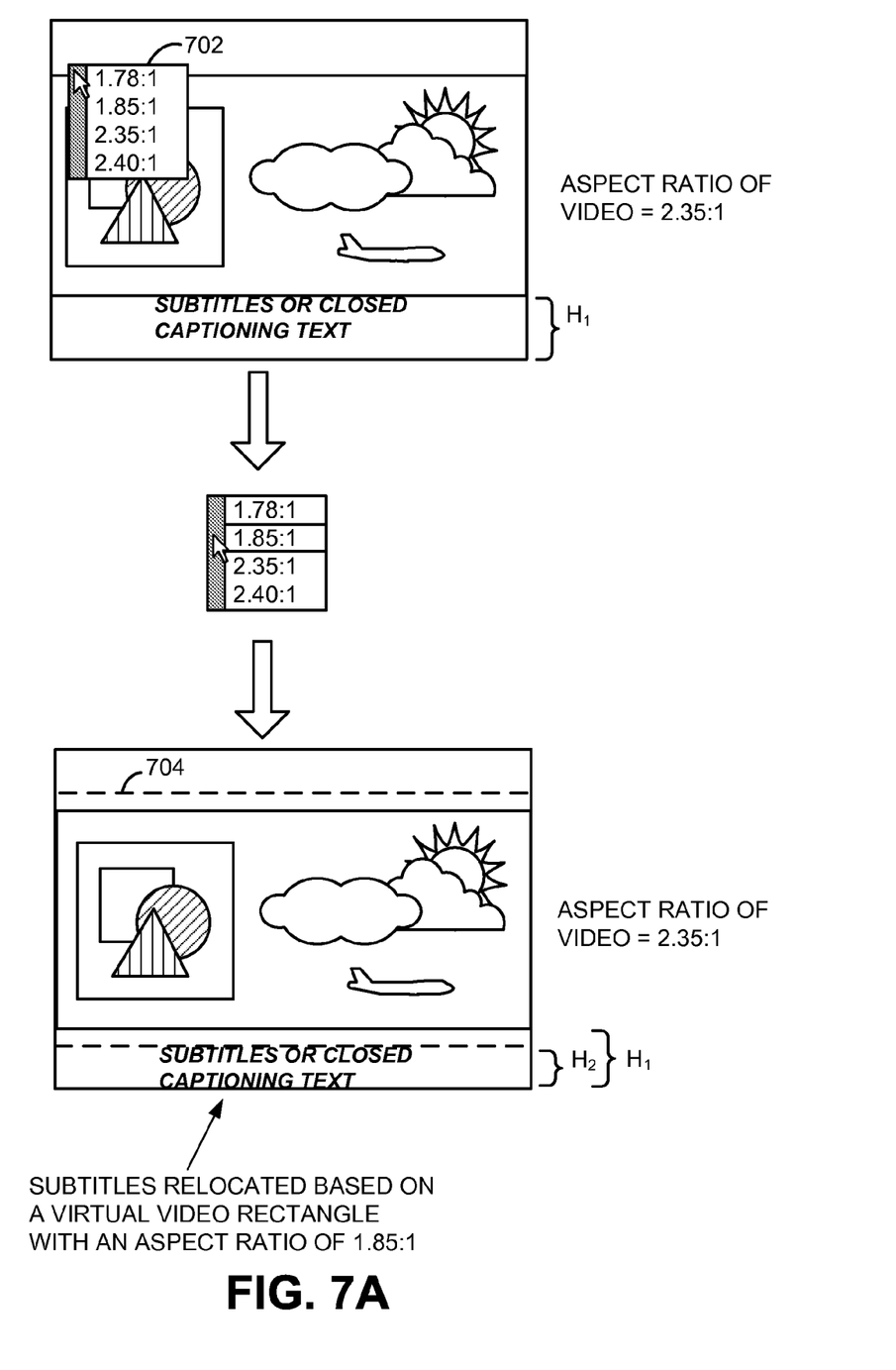
FIG. 7A illustrates an embodiment of a system for automatically adjusting text in a video wherein a user selects the aspect ratio of the video.

Reference is now made to FIG. 7A, which illustrates an embodiment of a system and method for automatically adjusting text in a video. In some embodiments, the user is given the option of manually selecting a new aspect ratio whereby the positioning of the subtitles or closed captioning is automatically adjusted based on the new aspect ratio selected. FIG. 7A illustrates one embodiment wherein a user interface is provided by the video viewing device depicted in FIG. 3. As discussed earlier, user interfaces may be provided to allow the user to perform such operations as: aligning text to the top edge of a display, aligning text to the top edge of a video, aligning text to the bottom edge of the display, and aligning text to the bottom edge of the video. In some embodiments, the user may right click on the display to activate a drop-down menu 702 offering selectable aspect ratios corresponding to a new location for the subtitles.

In the non-limiting example shown, suppose the aspect ratio of the video is 2.35:1, and a user may want to adjust the location of the subtitles such that the subtitle will be aligned to an edge corresponding to a video with an aspect ratio of 1.85:1 instead. In another non-limiting example, the video aspect ratio may actually be 1.85:1, but suppose the application used to display the video incorrectly recognizes the video aspect ratio as 2.35:1 such that the subtitles overlap with the video. When these situations arise and where the user selects a video aspect ratio of 1.85:1 from the drop-down menu 702, the subtitle is displayed as it would be for a video with an aspect ratio of 1.85:1. That is, the subtitles are aligned to an edge corresponding to a video with an aspect ratio of 1.85:1. One should note that the aspect ratio of the video itself is not changed, but the position of subtitle is changed according to the user's selection. As such, the subtitles are relocated based on a "virtual video rectangle" 704 (since the aspect ratio of the video itself remains unchanged).

Before a selection is made by the user, the top of the subtitles to the bottom of the display device is denoted by $H_1$, as shown in FIG. 7A. After the selection of the new aspect ratio by the user (1.85:1 in the example shown), the new height from the top of the subtitles to the bottom of the display device is denoted by a new height $H_2$ (where the new height depends on the new aspect ratio selected). One should note that for this embodiment where a new aspect ratio is selected, the aspect ratio of the video itself remains unchanged while the subtitles are relocated based on a new height $H_2$ which is calculated based on the new aspect ratio selected by the user from the drop-down menu. Upon selection of the new aspect ratio (which corresponds to the new location of the subtitles), the text is moved accordingly and remains aligned with the edge of the virtual video rectangle 704. The user may opt to select a particular aspect ratio based on viewing preferences.

Figure 7B:
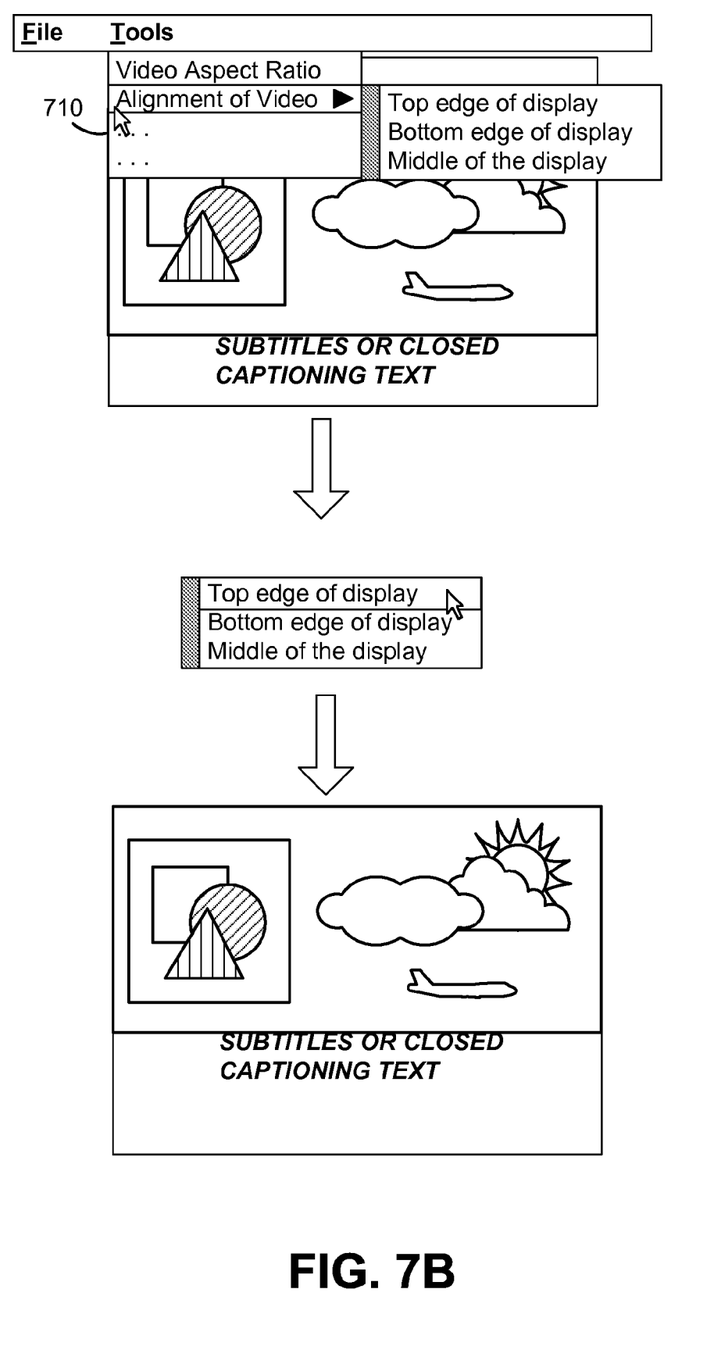
FIG. 7B illustrates an embodiment of a system for automatically adjusting text in a video wherein a user manually moves the location of the video.

Reference is now made to FIG. 7B, which illustrates an embodiment of a system for automatically adjusting text in a video wherein a user manually moves the location of the video. The user may be presented with a user interface configured to allow the user to manually move the video to either the top edge or the bottom edge of the display. In some embodiments, the user may left-click on a menu bar to activate a pull-down menu 710 offering selectable various locations where the video may be moved. The text is automatically resized to a size smaller than or equal to the size of the unused region. Furthermore, the text is placed in the unused region when the user elects to manually move the video. It should be noted that while a pull-down menu is utilized in the example above, alternative implementations for allowing a user to manually move a video are also included within the scope of the invention. In yet other embodiments, the user may also be given the option of selecting where to align the subtitles or closed captioning to suit the user's viewing preference. Generally, this may involve selecting either the top or bottom edge of the video or the top or bottom edge of one of the black bars.

Figure 8:
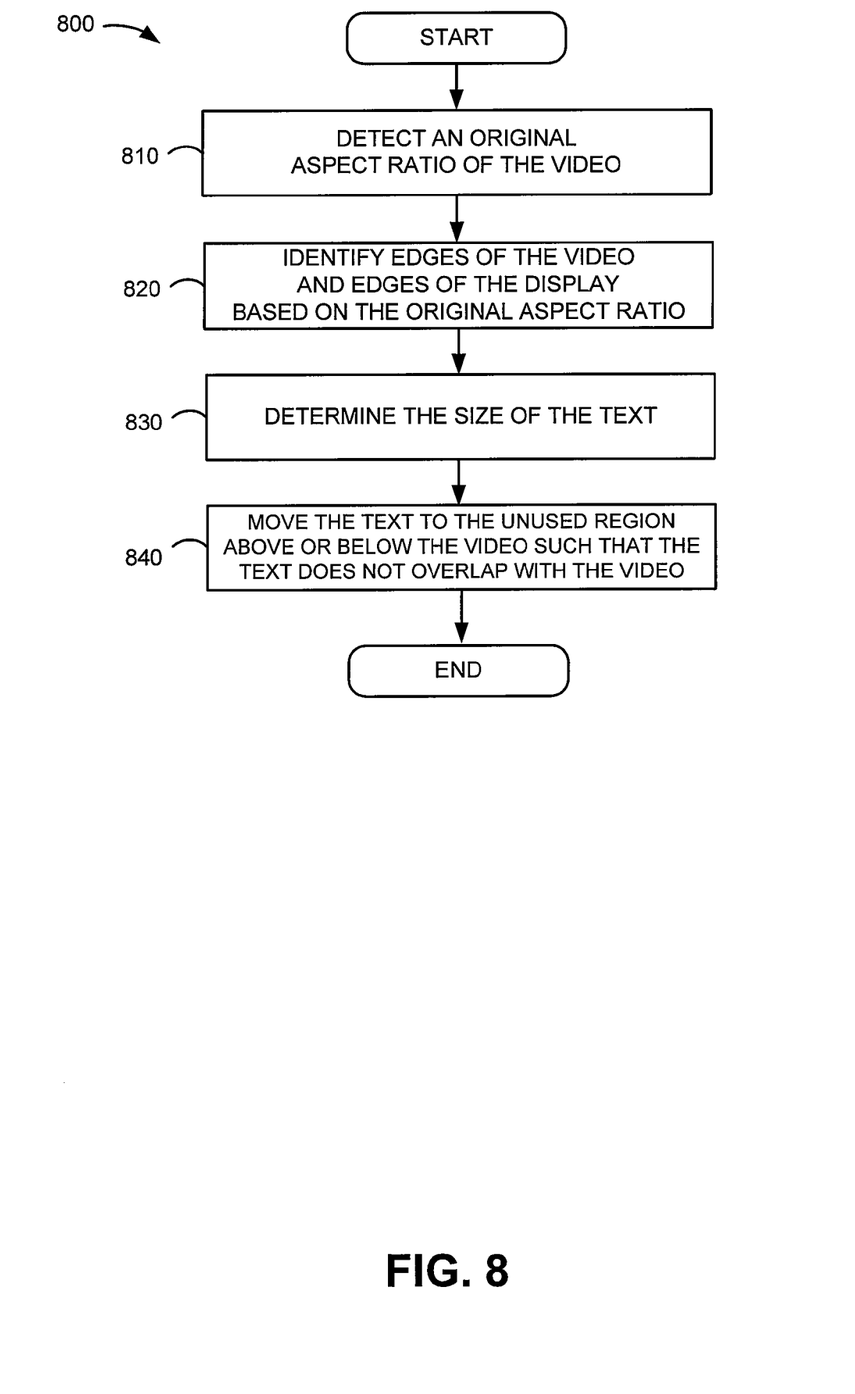
FIG. 8 depicts an embodiment of a method for automatically adjusting text in a video.

FIG. 8 depicts an embodiment of a method for automatically adjusting text in a video. At least one embodiment includes a method for automatic adjustment of text in a video on a display. Beginning with step 810, the original aspect ratio of the video is detected. Next, in step 820, the edges of the video and edges of the display are identified. In step 830, the size of the text (e.g., subtitles or closed captioning) is determined. The region between the video edges and the display are identified as this region defines the unused regions (or black bars) within the display. Finally, in step 840, the text is moved to the unused region either above or below the video and aligned to one of the edges identified in step 820.

It should be emphasized that the above-described embodiments are merely examples of possible implementations.

Many variations and modifications may be made to the above-described embodiments without departing from the principles of the present disclosure. All such modifications and variations are intended to be included herein within the scope of this disclosure and protected by the following claims.

At least the following is claimed:

1. A system for automatic adjustment of text in a video on a display comprising:
   a processor;
   a ratio detector executable in the processor and configured to detect an original aspect ratio of the video;
   an edge locator executable in the processor and configured to identify edges of the video based on the original aspect ratio detected, wherein regions between the edges of the video and edges of the display define unused regions;
   a size assessment module executable in the processor and configured to determine size of the text, wherein the size assessment module determines the size of the text by examining at least one of light portions within the text and a bounding rectangle which surrounds the text;
   a text adjuster executable in the processor and configured to move the text to the unused region above or below the video, wherein the text adjuster further aligns the text to at least one of the edges of the video and the edges of the display device; and
   a text size adjuster executable in the processor and configured to automatically resize the text in response to the text overlapping with the video after alignment of the text.

2. The system of claim 1, wherein the text comprises one of subtitles and closed captioning.

3. The system of claim 1, further comprising a user interface configured to allow a user to manually select an aspect ratio of the video to adjust a location of the text.

4. The system of claim 3, wherein the user manually selects an aspect ratio when the video is available in widescreen format, the user selecting from one of: 2.35:1, 1.85:1, 1.78:1, and 2.40:1.

5. The system of claim 3, further comprising an input device for aligning the text to an edge selected by the user.

6. The system of claim 5, wherein the input device comprises at least one of: a keyboard, a mouse, and a remote controller.

7. The system of claim 3, wherein the text is automatically resized to a size smaller than or equal to a size of the unused region and the text is moved to the unused region when the user manually selects an aspect ratio different from the original aspect ratio of the video.

8. The system of claim 1, further comprising a user interface configured to allow a user to manually move the video to either a top edge or a bottom edge of the display, wherein the text is automatically resized to a size smaller than or equal to a size of the unused region and the text is placed in the unused region when the user manually moves the video to either the top edge or the bottom edge of the display.

9. The system of claim 1, wherein the video and text are separate signals that originate from at least one of: a storage media, a broadcasting station, and a network server, wherein the storage media is one of: a Digital Video Disc (DVD), a Blu-ray Disc, and a HD (High Definition) DVD.

10. A method for automatic adjustment of text in a video on a display comprising:
    detecting, by a computing device, an original aspect ratio of the video;
    identifying, by the computing device, edges of the video based on the original aspect ratio, wherein regions between the video edges and edges of the display define unused regions;
    determining, by the computing device, the size of the text;
    moving, by the computing device, the text to the unused region above or below the video such that the text does not overlap with the video, wherein moving the text further comprises aligning the text to at least one of the edges of the video and the edges of the display; and
    automatically, by the computing device, resizing the text in response to the text overlapping with the video after moving the text.

11. The method of claim 10, further comprising allowing a user to manually select an aspect ratio for the video, the edges of the video determined according to the aspect ratio selected by the user.

12. The method of claim 11, further comprising automatically resizing the text to a size smaller than or equal to a size of the unused region and placing the text in the unused region when the user manually selects an aspect ratio different than the original aspect ratio of the video.

13. The method of claim 10, further comprising allowing a user to manually move the video to either a top edge or a bottom edge of the display, wherein the text is automatically resized to a size smaller than or equal to a size of the unused region and the text is placed in the unused region when the user manually moves the video to either the top edge or the bottom edge of the display.

14. The method of claim 11, wherein the user manually selects an aspect ratio when the video is available in widescreen format, the user selecting from one of: 2.35:1, 1.85:1, 1.78:1, and 2.40:1.

15. The method of claim 10, wherein the text comprises one of subtitles and closed captioning.

16. A non-transitory computer-readable medium embodying a program executable in a computing device, the program comprising:
    code for identifying edges of the video and edges of the display, wherein regions between the video edges and the display define unused regions;
    code for determining the size of the text;
    code for moving the text to the unused region above or below the video such that the text does not overlap with the video, wherein moving the text further comprises aligning the text to at least one of the edges of the video and the edges of the display; and
    code for automatically resizing the text in response to the text overlapping the video after moving the text.

17. The computer-readable medium of claim 16, further comprising code for automatically resizing the text if the size of the text overlap the video.

18. The computer-readable medium of claim 16, further comprising code for moving the video to either a top edge or bottom edge of the display, wherein the text is located in the unused region, and wherein the text is automatically resized to the size of the unused region.

19. The computer-readable medium of claim 16, further comprising code for allowing a user to manually select an aspect ratio for the video, the edges of the video determined according to the aspect ratio selected by the user.

20. The computer-readable medium of claim 16, further comprising code to automatically resize the text to a size smaller than or equal to a size of the unused region when the user manually selects an aspect ratio different than the original aspect ratio.

21. The computer-readable medium of claim 16, further comprising code allowing the user to move the video to either a top edge or bottom edge of the display, wherein the text is located in the unused region, and wherein the text is automatically resized to a size smaller than or equal to a size of the unused region.

22. The computer-readable medium of claim 16, wherein the text comprises one of subtitles and closed captioning.

* * * * *